US006167523A

United States Patent [19]
Strong

[11] Patent Number: 6,167,523
[45] Date of Patent: *Dec. 26, 2000

[54] METHOD AND APPARATUS FOR FORMS DATA VALIDATION AND PROCESSING CONTROL

[75] Inventor: Robert W. Strong, Forest Grove, Oreg.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/851,151

[22] Filed: May 5, 1997

[51] Int. Cl.$^7$ ............................ G06F 13/00; G06F 17/40; H04L 9/00
[52] U.S. Cl. ........................... 713/201; 707/507; 709/219
[58] Field of Search ...................... 707/504, 505, 707/506, 507, 508; 710/55; 345/338; 709/101, 217–219; 713/100, 200–202

[56] References Cited

U.S. PATENT DOCUMENTS

| | | | |
|---|---|---|---|
| 5,706,349 | 1/1998 | Aditham et al. | 380/25 |
| 5,736,984 | 4/1998 | Jellinek et al. | 345/338 |
| 5,764,906 | 6/1998 | Edelstein et al. | 395/200 |
| 5,771,381 | 6/1998 | Jones et al. | 713/100 |
| 5,784,555 | 7/1998 | Stone | 709/220 |
| 5,862,323 | 1/1999 | Blakley, III et al. | 395/188.01 |
| 5,892,898 | 4/1999 | Fujii et al. | 714/57 |
| 5,905,492 | 5/1999 | Straub et al. | 345/333 |
| 5,917,489 | 6/1999 | Thurlow et al. | 345/347 |
| 5,974,413 | 10/1999 | Beauregard et al. | 707/6 |
| 5,999,179 | 12/1999 | Kekic et al. | 345/349 |
| 6,004,276 | 12/1999 | Wright et al. | 600/508 |
| 6,014,666 | 1/2000 | Helland et al. | 707/9 |
| 6,029,246 | 2/2000 | Bahr | 713/200 |

OTHER PUBLICATIONS

Gittler et al, "The DCE Security Service", Hewlett Packard Journal, vol. 46, No. 6, p. 41(8), Dec. 1995.
Du et al, "Security Relevance Analysis on the Registry of Windows NT 4.0", Proceedings of 15th Annual Computer Security Applications Conference, pp. 331–340, 1999.
Tomlinson, The overhead of opening registry keys, Windows Developer's Journal, Jul. 1996.
lineback, J. Robert Al 'doctor' cures PC ills, Electronic Bussiness Today Jun. 1996 v22 n6 p34(2), Dec. 1996.
Leonhard, Woody The making of a Word Wizard. PC/Computing Aug. 1995 v8 n8 p208(2), Dec. 1995.
Rymer, J.R. Three steps toward a better business intelligence environment. Distributed Computeing Monitor, Dec. 1995.
Pacchiano, Ronald v. Networking. Windows Source Dec. 1996 v4 n12 p215(3), Dec. 1996.
Ticehurst, Darrell J. Organizing a successful commercial Internet site. DBMS May 1996 v9 n5 pS39(8) .
Tomlinson, Paula The registry. Windows Developer's Journal Mar. 1996 v7 n3 p63(5), Dec. 1996.

*Primary Examiner*—Joseph H. Feild
*Attorney, Agent, or Firm*—Cynthia T. Faatz

[57] ABSTRACT

A computer program for validating and controlling processing of input data from electronic forms such as Hypertext Markup Language (HTML) forms. Data including the input data is received from a form submitted to a server, wherein the server includes a registry. The program uses information stored in the registry to determine whether the input data from the form is valid.

25 Claims, 7 Drawing Sheets

Form 280

Please Sign Our Guest Book

Name (Required) [________] ~305

Age [________] ~310

EMail Address [________] ~315

Date of Birth
(mm/dd/yy) [________] ~320

[ Submit ] ~325

FIG. 3B

Form 280
HTML Source

•
•

<Form method = POST action = "cgi-bin/ABC.exe">

<input type = "hidden" name = "HTMLDATA" value = "Guestbk">

<pre>  ~355  ~350

Name (Required)   <input type = "text" name = "UserName">

Age               <input type = "text" name = "UserAge">

EMail Address     <input type = "text" name = "UserMail">

Data of Birth     <input type = "text" name = "DOB">

</pre>

Form 280

Please Sign Our Guest Book

| Name (Required) | | ~305 |
|---|---|---|
| Age | -256 | ~310 |
| EMail Address | somebody*xyz.com | ~315 |
| Date of Birth (mm/dd/yy) | 1/32/96 | ~320 |

Submit ~325

METHOD AND APPARATUS FOR FORMS DATA VALIDATION AND PROCESSING CONTROL

FIELD OF THE INVENTION

The present invention relates to the field of processing of electronic forms. More particularly, the present invention relates to a method and apparatus for validating and controlling processing of input data from electronic forms.

BACKGROUND OF THE INVENTION

With the growing use of the Internet in general, and more specifically, the World Wide Web ("the Web"), the use of electronic forms that may be filled out by users via remote client systems is also increasing. Electronic forms may be provided for many different purposes including gathering survey information, ordering products, creating guest books, and developing mailing lists.

Many such forms are developed using Hypertext Markup Language (HTML) as it is versatile and easily learned. HTML forms available on the Web are typically viewed through a user interface referred to as a browser. Examples of well-known browsers are Navigator™ from Netscape Communications Corporation and Internet Explorer™ from Microsoft Corporation.

In order for a server to receive and process data entered into fields of an HTML form by a remote client, a Common Gateway Interface (CGI) program specific to the form is typically developed. CGI is an open standard that defines how Web servers use external programs. The CGI programs (or scripts, depending on the language in which they are written) provide the output of an on-screen form to a data processing program to be processed. CGI programs may also provide for the output of the data processing program to be displayed to the client computer system from which the form was submitted.

The complexity of CGI programs can vary widely depending on the language used to develop the program and the validation and processing requirements of the form. PERL is a popular language in which to write CGI scripts because it is easily learned and powerful. PERL, however, is an interpreted language and is therefore inefficient. High level languages such as C/C++ may be used to develop CGI programs, but may require more development time and expertise.

One issue with current CGI program development is that the software developer must focus software development resources on data validation. CGI programs that process prior HTML forms must typically include code to validate the data entered into each of the fields of the form. Further, in many cases, a different CGI program must be custom-written for each HTML form that is to be processed. Such coding may be time and resource intensive, especially in the case of forms that provide for many different types of data and/or in the case of forms for which the validation requirements are complex.

Another disadvantage associated with current CGI programs, regardless of the language in which they are written, is that, in many cases, HTML designers are forced to provide a server directory path as well as specific data validation and processing information within the HTML form itself. The directory path is provided to indicate a location on the server at which a CGI program associated with the HTML form is located. The data validation and processing information indicates how the data entered into the form should be handled.

The directory path and data validation information is provided in HTML forms as "hidden fields." The hidden fields are hidden when the form is viewed through the browser in a typical manner. Most Web browsers, however, allow a user to view the source of the HTML file using a "View Source" or other similar command. In prior approaches, when viewing the HTML source, server directory information and data validation and processing control information can typically be viewed by the user. Such information may expose aspects of the server that would ordinarily not be known to others, and may therefore, create an unnecessary security risk. Additionally, where data validation and processing information is included in the HTML form, HTML form design can become cumbersome and time-consuming.

Another disadvantage associated with current CGI programs is that they often do not provide helpful error messages back to the computer system user if data entered into a field is incorrect or otherwise invalid. For example, if a field in a form is left blank where the field is required to be filled in, some CGI programs may only inform the user that there is an error in the form without identifying the source of the error. The user may then have to determine on her own what is wrong with the form, or try multiple times to correct the form before identifying the problem.

The limitations with respect to currently available CGI programs and other methods for validating and processing form input data have in certain instances, led to potentially increased server security risks, compromised forms processing efficiency, and caused user frustration.

SUMMARY OF THE INVENTION

A computer-implemented method for validating input data from an electronic form is described. The method comprises a first step of receiving data including the input data from the form submitted to a server, the server including a registry. In a next step, it is determined whether the input data is valid using information stored in the registry.

Other features and advantages of the present invention will be appreciated from the accompanying drawings and from the detailed description that follows below.

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for performing validation and controlling processing of input data from electronic forms such as Hypertext Markup Language (HTML) forms is described.

An intended advantage of one or more embodiments described below is reduced development time and effort required for electronic forms input data validation and processing. Other intended advantages of one or more embodiments described below may include flexible and robust data validation, processing and error reporting for many different electronic forms in many different environments, as well as a reduction in potential security risks that may be posed by providing data validation and processing information within an electronic form.

As will be described in more detail below, for one embodiment, a server including a registry receives data from an electronic form submitted by a client. The form may be an HTML form that includes one or more fields for data input and that is accessed and filled in by a remote client over the World Wide Web ("the Web"), for example. The data received from the form is evaluated to determine whether a registry key identifier is included in the data. If a registry key identifier is included in the data, then the form can be validated by the forms data validation and processing control method and apparatus of one embodiment.

In order to evaluate the data received from the form, information in one or more configuration registry keys (or subkeys) under the registry key indicated by the registry key identifier is accessed. For each field as it is evaluated, if the data in the field is invalid according to requirements specified in the one or more configuration registry keys, an error message corresponding to the field being evaluated is dynamically built and logged in an error log. Once all of the fields have been evaluated, if there are entries in the error log, a detailed and specific error message is provided to the user identifying the specific field(s) that include invalid data. If no invalid input data is identified, one or more data processing programs, also referred to herein as "handlers," are invoked by the data validation and processing control program to process the input data.

Figure 1:
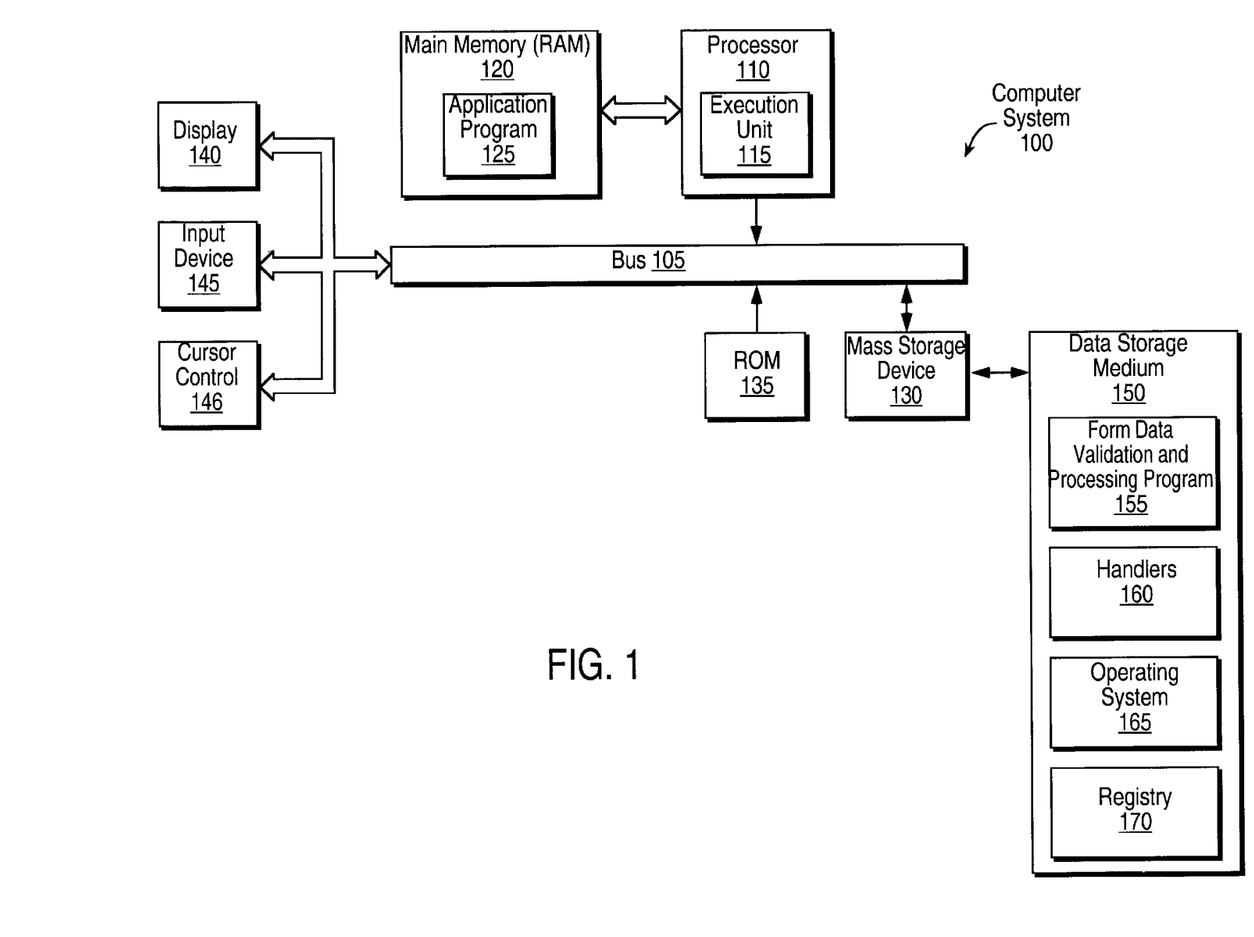
FIG. 1 shows a computer system that may be used to implement the forms processing program of one embodiment.

One embodiment is implemented through a set of software modules that may be executed on a computer system such as the computer system 100 shown in FIG. 1. In general, such computer systems include a bus 105 for communicating information, a processor 110 including an execution unit 115 coupled to the bus 105 for processing information, and a main memory 120 coupled to the processor 110 for storing information and instructions for the processor 110. For example, the main memory 120 may store an application program 125 that is transferred to the main memory 120 from another memory such as a mass storage device 130 also coupled to the bus 105.

The computer system 100 also includes a read-only memory (ROM) 135 coupled to the bus 105 for storing fixed information and instructions for the processor 110, a display device 140 coupled to the bus 105 for displaying information to the computer system user, and an input device 145 and/or cursor control device 146 coupled to the bus 105 for communicating information and command selections to the processor 110.

The mass storage device 130 is coupled to the bus 105 for storing information and instructions for use by the processor 110. A data storage medium 150 containing digital information is configured to operate with the mass storage device 130 to allow the processor 110 access to the digital information on the data storage medium 150 via the bus 105. The mass storage device 130 may be a conventional hard disk drive, floppy disk drive, compact disc read only memory (CD-ROM) drive, or other magnetic or optical data storage device for reading and writing information stored on the data storage medium 150, which may be a hard disk, a floppy disk, a CD-ROM, a magnetic tape, or other magnetic or optical data storage medium. The data storage medium 150 is capable of storing sequences of instructions that cause the computer system 100 to perform specific functions.

The forms data validation and processing control program 155 and handlers 160, as well as other software modules such as an operating system 165 and a registry 170, may be stored on the data storage medium 150 and subsequently loaded into and executed within the computer system 100 using well-known techniques. Although the software modules 155, 160, 165, and 170 are shown as being stored on a single data storage medium 150, each such module may be stored on a different data storage medium or in a memory, such as the main memory 120.

Figure 2:
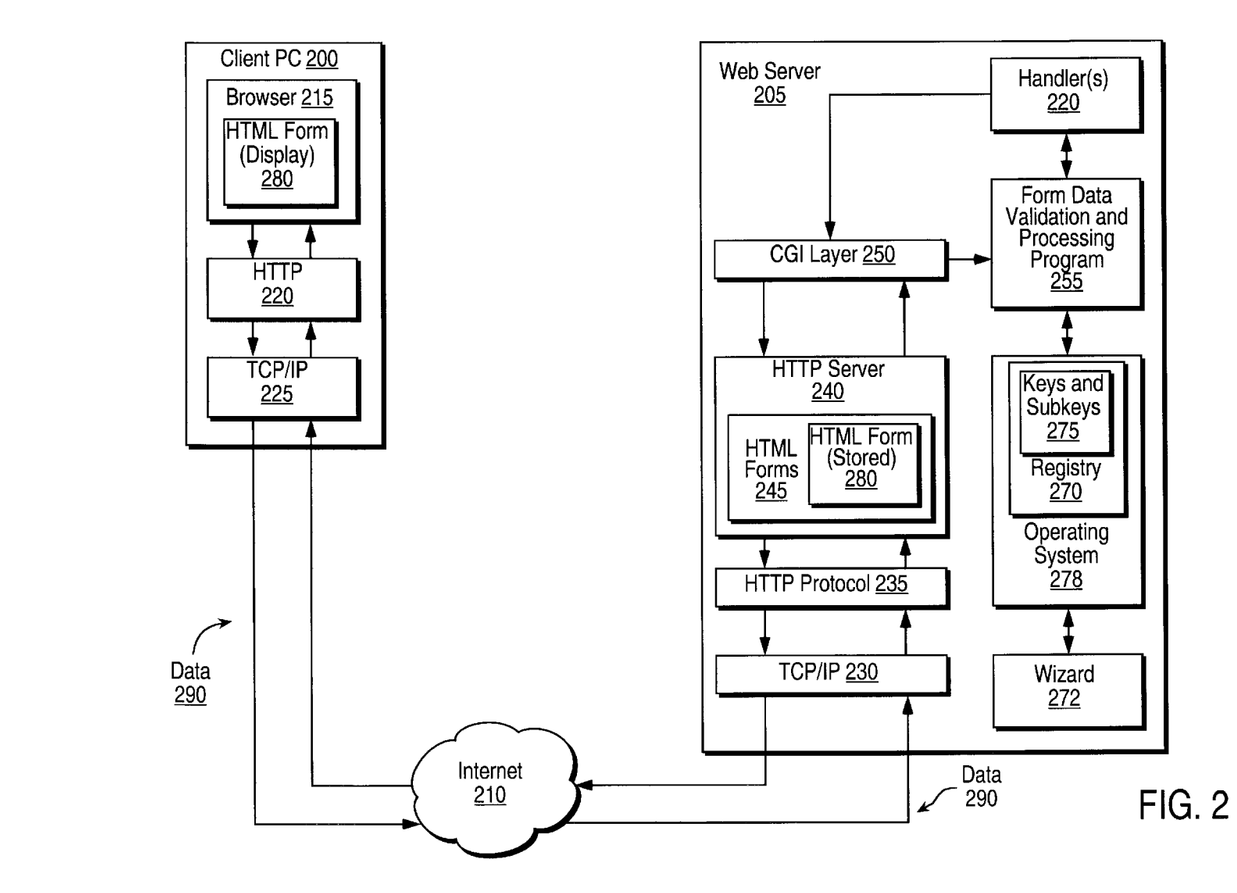
FIG. 2 is a high-level block diagram of a client-server environment implementing the form data validation and processing control program of one embodiment.

FIG. 2 illustrates an example of a client-server environment and an overview of the software modules that operate with, and are used to implement the forms data validation and processing control program of one embodiment. In this example, a client personal computer system (PC) 200 is connected or capable of being connected to a server 205, such as, a Web server, over the Internet 210 or another network such as a wide area network (WAN) or a local area network (LAN). Both the client PC 200 and the Web server 205 may be similar in configuration and operation to the computer system 100 described above with reference to FIG. 1.

Along with other software, such as an operating system (not shown), the client PC 200 includes a browser program 215, a Hypertext Transfer Protocol (HTTP) layer 220, and a Transmission Control Protocol/Internet Protocol (TCP/IP) layer 225.

The browser program 215 may be a program such as Navigator™ from Netscape Corporation, or Internet Explorer™ from Microsoft Corporation which provides a software interface for viewing Web pages and other information available on the Internet.

HTTP is an application-level communications protocol used to access hypermedia documents, such as Web pages, that may include hypertext links. HTTP has been primarily used as the basic transport protocol for the Web.

TCP/IP is a well-known set of transport protocols used to communicate over networks in general, and in particular, the Internet. Transport protocols other than TCP/IP may also be used in other embodiments.

The server 205 includes a TCP/IP layer 230 and an HTTP protocol layer 235. Additionally, the server 205 includes an HTTP server 240 that provides access to information such as HTML forms 245 stored on the server and a Common Gateway Interface (CGI) layer 250.

For one embodiment, the forms data validation and processing control program 255 is stored on the Web server 205. The handlers 260 associated with HTML forms to be processed, and the registry 270 including registry keys and subkeys 275 storing configuration and validation information specific to forms to be processed are also stored on the Web server 205 in one embodiment. A registry wizard program 272 may also be included to assist in registry configuration for a specific set of forms as described in more detail below.

For one embodiment, the registry 270 is part of an operating system 278. For one embodiment, the registry 270 is a Windows NT® registry and the operating system 278 is a Windows NT operating system (Windows NT is a registered trademark of Microsoft Corporation). The registry in Windows NT is provided to store system and software configuration information such as user options for particular applications programs and start-up information.

In Windows NT, the registry provides a secure, unified database that stores configuration data in a hierarchical structure. Windows NT along with the Windows NT file system (NTFS) enforces access control for registry files so that it is more difficult for computer system users to intentionally or unintentionally alter or delete registry information on a running system. In this manner, it is more difficult for a client system 200 user to access Web server 205 information that is stored in the registry 270 as compared to information that is stored in a standard file on the server 205.

The registry 270 includes keys and subkeys 275 and is organized in a manner similar to a directory structure. Keys and subkeys may both be referred to herein under the more general term "keys" in order to indicate that the information in the key or subkey may be stored at any level of the registry 270. Both Windows NT and the Windows 95 registries are accessed using the Win32 application programming interface (API) (not shown).

In other embodiments, a different registry and/or operating system, such as a Windows 95, Windows 95 follow-on or Windows NT follow-on operating system and associated registry, may be used in a similar manner. Other registries that are accessed in a different manner, a stand-alone registry not associated with an operating system, or another structure providing access control may also be used in other embodiments.

With continuing reference to FIG. 2, for one embodiment, the forms data validation and processing control program 255 is a CGI executable written in C/C++ such that the program 255 runs native on a variety of different platforms. In this manner, the forms data validation and processing control program 255 operates efficiently in many different environments.

The handlers 260 may include one or more different handlers for each of the HTML forms 245 that may be accessed by the client PC 200 or another software or hardware client. Further, the handlers 260 may include a different handler for each type of data to be processed such that multiple handlers are used to process a single form, but may be re-used for multiple forms.

For one embodiment, the handlers 260 are implemented as Windows dynamic link libraries (DLLs), but may be implemented in a different manner in other embodiments and where other operating systems are used.

Both the client PC 200 and the Web server 205 computer systems may include other software and/or hardware modules and devices not shown in FIGS. 1 and 2 such as network drivers and devices, and other applications software.

The inter-operation of the various software modules according to one embodiment is described in more detail with continuing reference to FIG. 2. For purposes of illustration, it is assumed that a user chooses to access a particular form 280 of a variety of forms 245 stored on the Web server 205 and served by the HTTP server 240. The browser 215 on the client PC 200 is used to locate the form 280 on the Web server 205 over the Internet 210 in a manner well-known to those of skill in the art. The browser 215 is also used to display the form 280 to the client PC 200 user such that he or she may fill out the form 280 by entering input data into its various fields.

Figure 3A:
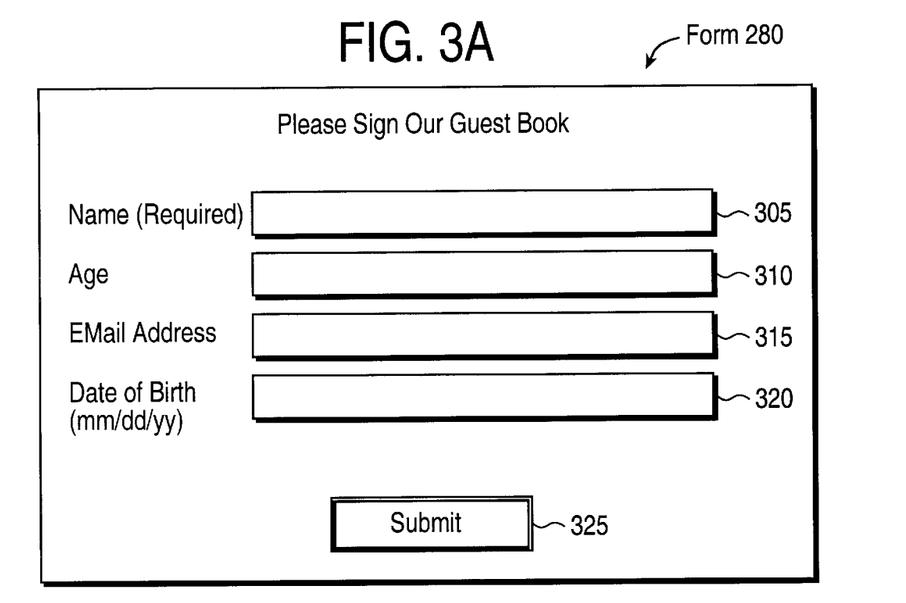
FIG. 3A shows an example of a guest book form as viewed by the user through a browser.

FIG. 3A shows the form 280 as it may look when viewed by the client PC 200 user through the browser 215 of FIG. 2 in a typical viewing scenario (i.e. without viewing the HTML source code). The form 280 is a simple guest book entry form. The form 280 of FIG. 3A, however, is exemplary and many other types of forms and form configurations may be similarly processed in accordance with various embodiments.

The form 280 as shown in FIG. 3A includes multiple fields 305, 310, 315 and 320. The first field 305 in this example requires the client PC 200 user to enter his or her name. The second field 310 requests the user's age. The third field 315 requests the user's email address, and the fourth field 320 requests the user's date of birth. A submit button 325 is also provided.

Figure 3B:
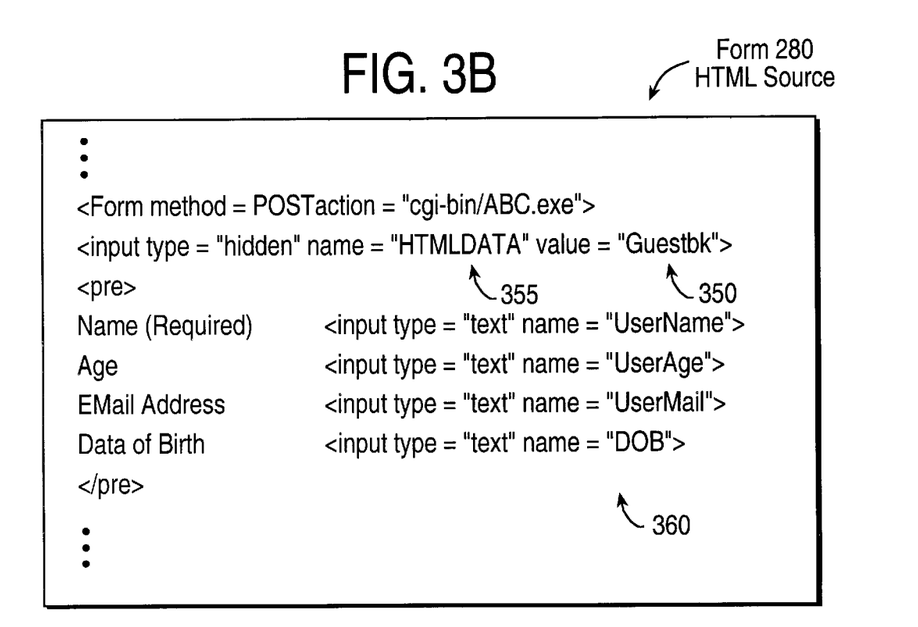
FIG. 3B shows the form of FIG. 3A following a "View Source" command issued by the client user through the browser.

FIG. 3B illustrates a portion of the form 280 as it might look to the client PC 200 user following a "View Source" or other similar command issued through the browser 215. Where the browser 215 (FIG. 2) is a Netscape browser, for example, the client PC 200 user may choose to view the source code of the form 280 at any time while viewing or entering data into the form 280, although viewing the source code is not a necessary or typical step taken while viewing the form.

The source code of the form 280 is HTML source code in this example, although other types of forms may be validated and processed in accordance with other embodiments. The HTML source code of the form 280 shown in FIG. 3B includes a first server registry key identifier 350 following the FORM declaration. The registry key identifier 350 identifies the location in the server registry 270 (FIG. 2) at which processing and validation information specific to the form 280 is located. If the server 205 (FIG. 2) hosts multiple forms, a different key or subkey identifier may be indicated in each different form.

The source code of the form 280 in accordance with one embodiment also includes an indicator name 355, "HTML-DATA" in this case, that indicates to the forms validation and processing program 255 (FIG. 2) that the form has corresponding configuration information in the registry 270 under or otherwise associated with the registry key indicated by the registry key identifier 350 that follows.

As also shown in FIG. 3B, in the HTML source code, each field in the form 280 is identified by a field variable name. For example, "DOB" is the field variable name 360 associated with the field in which the user is to enter her date of birth. The field variable name is used during input data validation and for providing meaningful error messages back to the client in one embodiment as described in more detail below. Other aspects of the source code of the form 280 shown in FIG. 3B are not provided in detail as they are not material to the method or apparatus of the embodiments discussed herein.

Figure 3C:
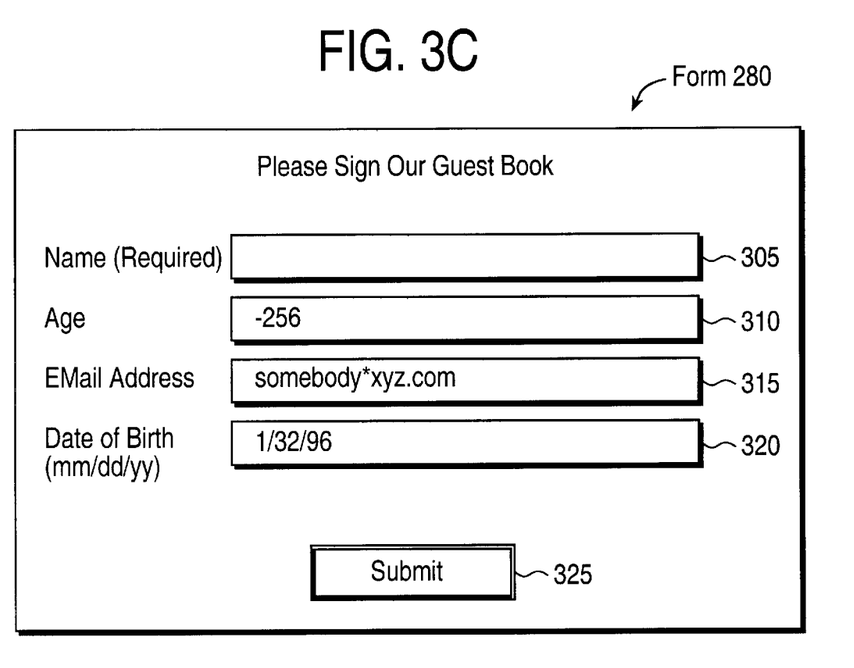
FIG. 3C shows the form of FIG. 3A as it may look following data input by a client user.

Referring back to FIG. 3A, once the client system 200 user is viewing the desired form 280, she enters the required and/or requested information into the form 280. FIG. 3C illustrates the form 280 of FIG. 3A with exemplary information entered into its various fields.

It is assumed for purposes of example, in order to illustrate the capabilities of the invention, that nothing is entered in the "NAME" field 305, "–256" is entered in the age field 310, "somebody*xyz.com" in the "EMAIL ADDRESS" field 315 and "1/31/96" in the "DATE OF BIRTH" field 320 as shown in FIG. 3C.

Following entry of data into the form 280, the form 280 is submitted by the client PC 200 user by clicking on the submit button 325, for example. For one embodiment, submitting the form causes data 290 from the form including input data entered into the form to be transmitted from the client PC 200 to the server 205. Referring back to FIG. 2, the data 290 from the form 280 is transmitted through the HTTP 220 and TCP/IP 225 layers, over the Internet or other network 210, and back to the Web server 205 for processing.

The data 290 from the form 280 includes the first registry key identifier 350 following the FORM declaration as well as all of the pairs of field variable names and associated input data entered at the client PC 200. The field variable names and user-entered values are referred to together as name-value pairs. Further, input data corresponding to a particular field may be referred to herein as a data item or input data item to distinguish it from the collective input data.

When the data 290 is received by the server 205, it is transmitted through the TCP/IP layer(s) 230, the HTTP protocol layer 235, the HTTP server 240 and the CGI layer 250 to the form data validation and processing program 255. Once the data 290 is received, the form data validation and processing program 255 controls data validation, error reporting and processing of the input data.

The data validation and processing method of one embodiment is described in more detail with reference to FIG. 4 as well as to FIGS. 2, 3C, 5, 6 and 7 as needed.

Figure 4:
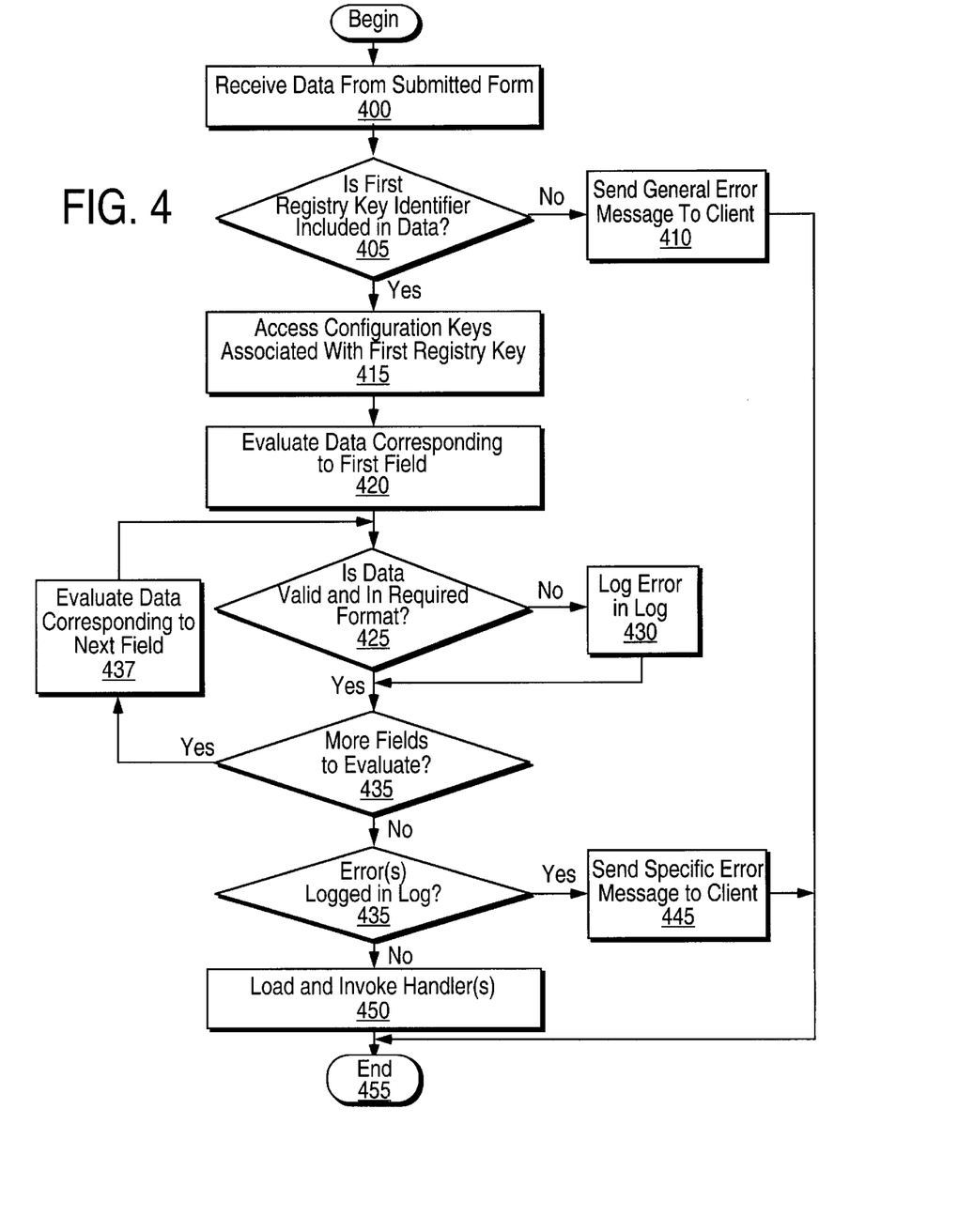
FIG. 4 is a flow diagram showing the form input data validation and processing control method of one embodiment.

In FIG. 4, after the data 290 from the form 280 is received in step 400, the form validation and processing program 255 determines whether the data includes a first registry key identifier in step 405. If a registry key identifier is not identified by the program 255, then in step 410, a general error message is sent to the client computer system 200. The error message may indicate a server error, for example, or inform the client PC 200 user that the form cannot be processed.

In the case of the form 280, the registry key identifier 350 (FIG. 3B) is identified by the form data validation and processing program 255, so in step 415 (FIG. 4), configuration subkeys under or otherwise associated with the registry key indicated by the registry key identifier 350 are accessed in order to validate the data 290 from the form. Configuration information may be stored under the registry key identified by the registry key identifier 350 without using separate configuration subkeys.

Figure 5:
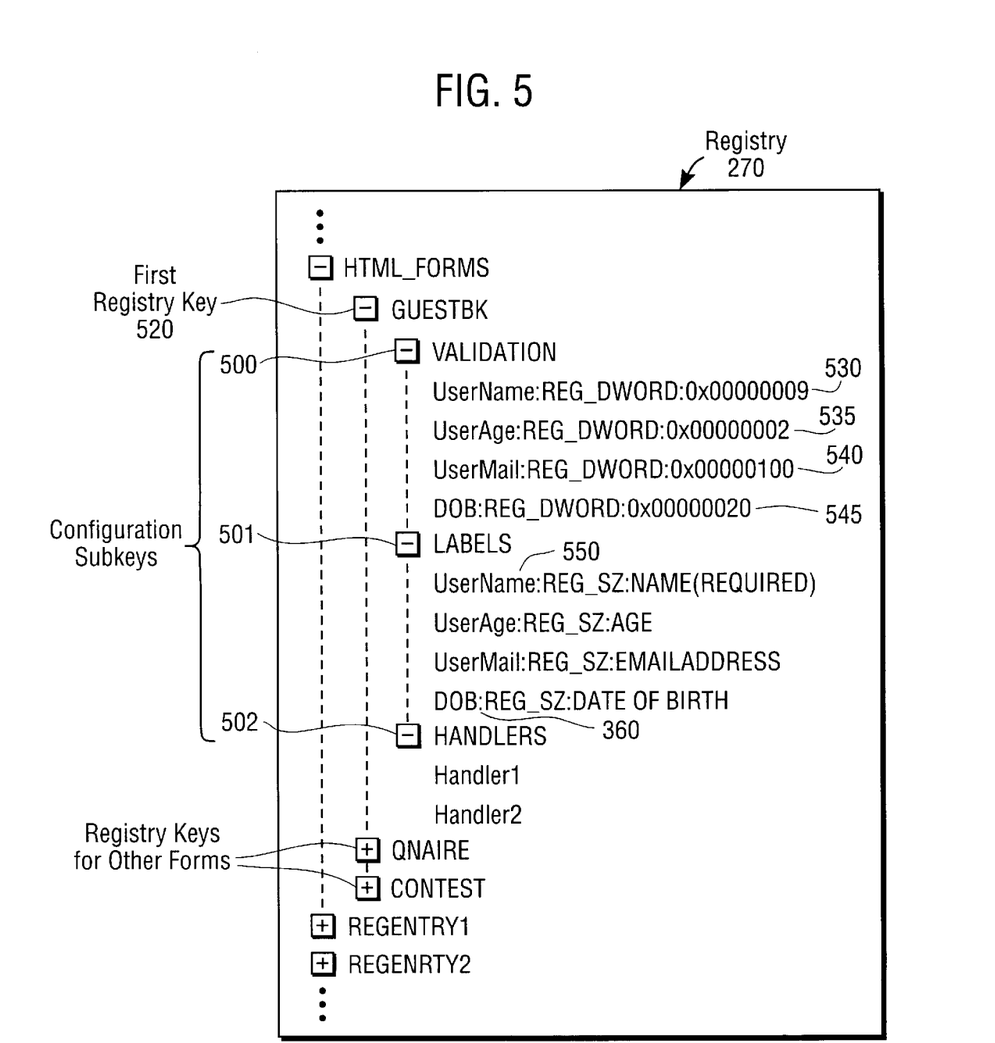
FIG. 5 is an example of a registry structure that may be used in one embodiment.

FIG. 5 illustrates an example of the registry 270 including a first registry key 520 indicated by the registry key identifier 350 and configuration subkeys 500–502. For one embodiment, each registry key corresponding to an HTML forms file includes or is associated with three or more configuration subkeys: a Validation subkey 500, a Labels subkey 501 and a Handlers subkey 502 as shown in FIG. 5 under the registry key 520. A different number of configuration subkeys may be included in other embodiments.

The Validation subkey 500 includes rules used to evaluate the input data submitted by the client PC 200 user. The Labels subkey 501 is used to resolve the HTML variable names to the names actually displayed on an HTML page in order to provide a meaningful error message back to the client PC 200 user as described below. The Handlers subkey 502 defines how to process input data once validation has been successfully performed.

For one embodiment, the information in the Validation, Labels, and Handlers subkeys 500–502 is entered into the registry 270 by a software program 272 (FIG. 2) that provides support for a specific set of forms. The software program 272 may be in the form of a wizard, a program that automatically configures the registry keys and subkeys based on user responses to predetermined questions. In another embodiment, an HTML programmer or other person manually enters the information required to configure the registry keys and configuration subkeys.

Referring back to FIG. 4, in step 420, the input data item corresponding to the first field of the form 280, field 305 (FIG. 3C), is evaluated. The form data validation and processing control program 255 validates INPUT type fields in an HTML form in one embodiment. Input type fields may include input data such as text, passwords, checkbox, and/or radio button inputs, for example.

The field validation requirements, as mentioned above, are specified in the Validation subkey. For one embodiment, an entry in the Validation subkey has the following format: <field variable name>:<REG_DWORD>:<arg>, where <field variable name> is the name of the field variable as identified in the HTML source code, <REG_DWORD> is registry-specific and specifies the type of data being stored, and <arg> refers to an argument that further defines the type of input data that is to be considered valid as described below.

For one embodiment, the argument is implemented as a code in the form of bit flags in order to indicate the type of data that is to be considered valid for a given field. For one embodiment, the <arg> field is implemented as follows:

0x00000000—No validation requirements

0x00000001—Mandatory entry field; Data must be entered for form to be processed

0x00000002—Input can only be numeric, unsigned (>0)

0x00000004—Input can only be numeric, signed or unsigned (e.g. 1, –1, 55, –256)

0x00000008—Input can be any character except 0–9, and control codes (0x00–0x19)

0x00000010—Input can only be numeric, signed/ unsigned, with/without decimal pt.

0x00000020—Input can only be a date with the format: mo./day/year (e.g. 1/31/90)

0x00000040—Input can only be a date with the format: day/mo./year (e.g. 31/1/90)

0x00000080—Input can only be date with the format: month/year (e.g. 1/90)

0x00000100—Input can only be an email address (e.g. myname@myserver.com)

0x00000200—Input can only be a credit card number

Other types of arguments may be included in other embodiments and arguments in addition to those above may be provided for different types of input data.

For one embodiment that uses the arguments provided above, the "mandatory entry field" argument can be combined with any other argument. The mandatory entry field argument requires data to be entered into the corresponding field before the form 280 can be processed by the data validation and processing control program 255. In other words, a field that has a mandatory entry field argument associated with it is considered to include invalid data if left blank.

Using this approach, any field that does not have a mandatory entry field argument associated with it can still be considered valid even if the user does not enter any information into the field. Information that is entered into the field, however, may still have to meet specified requirements in order for the information to be considered valid.

Using the arguments above, the Validation subkey entries for the form 280 of FIG. 3A are shown in FIG. 5. "User-Name" is the field variable name for the "NAME (REQUIRED)" field 305 that is a mandatory entry field allowing alphanumeric input as indicated by the argument 530; "UserAge" is the field variable name for the "AGE" field 310 for which the input is valid if in the form of an unsigned integer or the field is left blank as indicated by the argument 535; "UserEmail" is the field variable name for the "EMAIL ADDRESS" field 315 for which valid input is an email address or no entry as indicated by the argument 540; and "DOB" is the field variable name for the "DATE OF BIRTH" field 320 for which valid input is a date in the form of mm/dd/yy or no entry is made as indicated by the argument 545.

In the case of data entered into an HTML form, a current version of the HTML specification states that fields without values assigned to them (i.e. the user left the field blank) may not be sent by the browser 215 to the server 205. For one embodiment, even if there are no validation requirements associated with a particular field or the field input data is to be considered valid even if left blank, an entry in the Validation subkey is used such that a field identifier is provided to any handlers associated with the form even if the field is left blank.

Referring now to FIGS. 3C and 5, the argument 530 for the field 305 is interpreted by the data validation and processing control program 255 to determine the particular validation routine within the program 255 to run to validate any data entered into the field 305. In the example provided in FIG. 3C, the user has not entered any data into the field 305. In step 425 of FIG. 4, because the field 305 is a mandatory entry field as determined by the argument 530 corresponding to the field 305 in the Validation subkey 500, the input data item corresponding to the field 305 is not valid. In step 430, an error message corresponding to the field 305 is dynamically built and logged into an error log.

Figure 6:
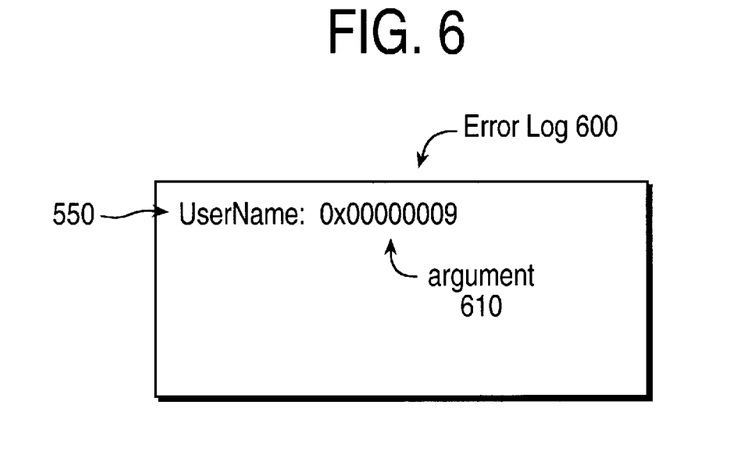
FIG. 6 is an example of an error log that may be used in one embodiment.

An example of an error log 600 following validation of the input data in the field 305 is shown in FIG. 6. The error log is dynamically built using information in the Labels and Validation subkeys 501 and 500 (FIG. 5) including the field variable name 550 (FIGS. 5 and 6) and the argument 530 corresponding to the field 305 for which invalid input data was identified. The Labels subkey 501 indicates a correspondence between the field variable name for each field and the name of the field as seen when viewing the form. For example, the field variable name "DOB" 360 (FIGS. 3B and 5) corresponds to "DATE OF BIRTH" as seen on the form 280. "REG_SZ" in this embodiment is required by the registry to indicate the type of data associated with the corresponding registry key—in this case, a character string that is NULL terminated.

Referring back to FIG. 4, in step 435, it is determined that there are more fields to evaluate and in step 437, the next field, the field 310 in this case, is evaluated. Similarly, based on the argument 535 provided for the field 310 (variable name UserAge) under the Validation subkey in FIG. 5, the data is determined to be invalid and a corresponding error message is logged into the error log 600. The same process is repeated for the fields 315 and 320.

In the case of the field 320, the data is validated and determined to be valid based on the specified argument 545 for the "DOB" field under the Validation subkey 500. In this case, following step 325, the method proceeds directly to step 435 without logging an error into the error log 600 (FIG. 6). In step 435, it is determined that there are no additional fields to evaluate and in step 440 it is determined that there are errors logged in the error log 600 (FIG. 6).

Once all the fields of the form 280 have been evaluated, in step 445, the data validation and processing control program 255 (FIG. 2) sends the dynamically built error log as an error message 600 to the client PC 200. The error message 600 is communicated to the client PC 200 from the server 205 through the CGI layer 250, the HTTP server, 340, the HTTP protocol and TCP/IP layers 335 and 330, and over the Internet 310.

Figure 7:
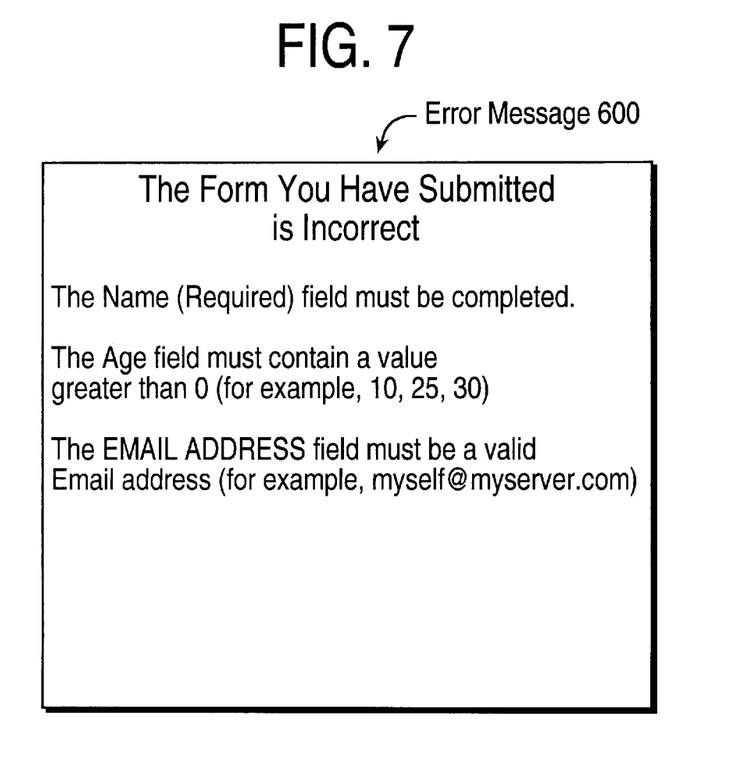
FIG. 7 is an example of the error log of FIG. 6 as it may look following validation of all fields of the form of FIG. 3C and which may be sent as an error message.

FIG. 7 illustrates an example of what the completed error log/error message 600 might look like for the data entered into the form 280 in FIG. 3C. As shown in FIG. 7, the error message 600 is detailed and specific providing instructions to the client PC 200 user regarding how to correct the errors for each of the fields for which invalid data was detected.

For one embodiment, the error message 600 is an HTML document that can be viewed by the browser 215 on the client PC 300. The error message 600 is dynamically constructed by the data validation and processing control program 255 in one embodiment using resource compiler (.RC) files in conjunction with a Resource Compiler product from Microsoft Corporation together with information stored in the Validation 500 and Labels 501 subkeys shown in FIG. 5. The .RC files in this embodiment provide the text used in the error message specific to each argument and can be indexed by the field variable name. For one embodiment, the particular string extracted and entered into the error log to create the error message is controlled by the data validation and processing control program 255 in conjunction with Win32 libraries (not shown) available with the Windows NT operating system 278 (FIG. 2). Operating systems other than Windows and Window NT that provide similar capabilities may also be used for other embodiments.

The text provided in response to each detected error can be customized to be as detailed and specific as desired. In this manner, the error message 600 can indicate to a user in an understandable manner, the specific field(s) for which invalid input data has been detected. Similarly, the data validation and processing control program 255 can be configured to provide error messages in languages other than English to facilitate locale-specific support without significant additional programming resource investment.

After the error message 600 is sent, it is assumed for purposes of example that the form 280 is re-submitted from the client PC 200 with valid information entered into each of the fields 305, 310, 315 and 320 (FIG. 3A). The validation process described above with reference to FIG. 4 is repeated. In step 435, when all fields have been evaluated and in step 440, no errors are entered into the error log/message 600 (i.e. all input data has been determined to be valid), then in step 450, the form data validation and processing control program 255 loads and invokes any handlers associated with the form 280. The handler(s) associated with the form 280 (if any) are indicated in the registry configuration subkeys under the Handlers subkey 502.

The data validation and processing control program 255 transfers processing control to a first handler associated with the form 280, handler1, under the Handlers subkey 502 as shown in FIG. 5. Once processing by handler1 is completed, the data validation and processing control program 255 invokes and transfers control to handler2. If other handlers exist, the data validation and processing control program will load and transfer control to each handler successively.

Handlers therefore act as "plug-in" modules that can be added to perform any variety of processing tasks simply by entering the handler filename into the configuration subkeys under the Handlers subkey 502. In this manner, data processing support can be easily customized. Once processing is complete, any output from the handlers may be sent back to the client PC 200 and the method ends at step 455.

For one embodiment, the data validation and processing control program 255 uses the Win32 (a Windows or Windows NT application programming interface) function LoadLibrary( ) where the handlers are implemented as Windows DLLs. As each handler is invoked, the data validation and processing control program 255 also passes the input data received from the form 280 to each of the handlers. For one embodiment, the data is passed in the form of an array of pointers to null-terminated name/value pairs.

In the foregoing specification, the invention has been described with reference to specific exemplary embodiments thereof. It will, however, be evident that various modifications may be made without departing from the broader spirit and scope of the invention as set forth in the appended claims. The specification and drawings are, accordingly, to be regarded in an illustrative rather than a restrictive sense.

What is claimed is:

1. A computer-implemented method for validating input data, the method comprising:

receiving data including input data from a form submitted from a first computer system to a second computer system, the form being stored on the second computer system and electively accessed via the first computer system, the second computer system including a registry; and determining whether the input data is valid using information stored in the registry.

2. The computer-implemented method of claim 1 further including determining whether the data from the electronic form includes a first registry key identifier and wherein determining whether the input data is valid is performed only if the data includes the first registry key identifier.

3. The computer-implemented method of claim 1 wherein the information stored in the registry is stored in at least one configuration key associated with a first registry key identified in the data.

4. The computer-implemented method of claim 1 wherein the form includes fields for entering input data and the data received from the form includes input data corresponding to the fields, wherein determining whether the input data is valid includes:

comparing input data corresponding to each field with a corresponding entry in the registry, if a first item of input data corresponding to a particular field is invalid, indicating an error in an error log, and repeating comparing and indicating until input data corresponding to all fields of the form have been evaluated.

5. The computer-implemented method of claim 4 further including:

if an error has not been indicated in the error log after input data corresponding to all fields of the form have been evaluated, invoking a data processing program to process the input data, and if at least one error has been indicated in the error log after input data corresponding to all fields of the form have been evaluated, sending an error message to the first computer system.

6. The computer-implemented method of claim 5 wherein the data processing program to be invoked is specified in the registry.

7. The computer-implemented method as set forth in claim 4 wherein indicating an error in an error log includes dynamically building an error message corresponding to the particular field using the information stored in the registry.

8. The computer-implemented method of claim 1 wherein the electronic form is a Hypertext Markup Language (HTML) form accessed by a client over the Internet.

9. An apparatus comprising:

a registry in a first computer system to store a registry key corresponding to an electronic form to be stored in the first computer system; and a form data validation and processing control module in the first computer system to determine whether input data entered into the electronic form via a second computer system is valid using information stored in the registry, wherein the form is electively accessed by the second computer system.

10. The apparatus of claim 9 wherein the form data validation and processing control module only determines whether the input data is valid using information stored in the registry if data from the electronic form including the input data identifies the registry key.

11. The apparatus of claim 9 wherein the information stored in the registry that is used to determine whether the input data is valid is stored in one or more configuration subkeys corresponding to the registry key.

12. The apparatus of claim 9 wherein the registry specifies one or more data processing programs and wherein the form data validation and processing control module invokes one of the data processing programs if the input data is determined to be valid.

13. The apparatus of claim 9 wherein the electronic form includes one or more input fields and the input data includes one or more data items corresponding to the one or more input fields, and wherein the form data validation and processing control module is further to dynamically produce an error message to indicate each of the fields for which the corresponding data item is determined to be invalid using the information stored in the registry.

14. The apparatus of claim 13 wherein the registry includes at least one configuration subkey to indicate a data processing program to be invoked if the input data is determined to be valid, and to store the information used to determine whether the input data is valid, the information including validation information corresponding to each field.

15. The apparatus of claim 9 further including a wizard coupled to the registry, the wizard to respond to input information to configure the registry and store the information used to determine whether the input data is valid.

16. A computer system comprising:

a processor to process information;

a registry; and a form data validation and processing program stored in a memory coupled to the processor, the form data validation and processing program to be executed by the processor to determine whether input data received from an electronic form from a remote computer system is valid using information stored in the registry, wherein the electronic form is stored in the computer system and electively accessed by the remote computer system.

17. The computer system of claim 16 further including a network connection wherein data from the electronic form including the input data is received from a client system through the network connection.

18. The computer system of claim 16 wherein the registry includes a first registry key corresponding to the electronic form and wherein the form data validation and processing control program is further to determine whether data from the electronic form including the input data identifies the first registry key.

19. The computer system of claim 16 wherein the form data validation and processing control program is further to dynamically build an error message using information stored in the registry if input data is invalid.

20. The computer system of claim 19 wherein the error message specifies each field of the electronic form for which input data is determined to be invalid.

21. The computer system of claim 16 further including a wizard coupled to the registry to control storage of the information in the registry used to determine whether the input data is valid.

22. The computer system of claim 16 wherein the registry is part of an operating system.

23. A machine readable medium having stored thereon data representing sequences of instructions, which, when executed by a first computer system, cause the first computer system to perform a process comprising:

providing a second computer system elective access to an electronic form; and determining whether input data entered into the electronic form from the second computer system is valid using information stored in a registry on the first computer system.

24. The machine readable medium of claim 23 further causing the first computer system to perform the process comprising:

determining whether data from a particular electronic form can be validated by determining whether the data identifies a valid registry key in the registry.

25. The machine readable medium of claim 23 further causing the first computer system to perform the process comprising:

dynamically building an error message indicating each field of the electronic form for which input data was determined to be invalid using the information stored in the registry, sending the dynamically built error message to a client from which the input data was received if input data was determined to be invalid, and invoking a data processing program indicated in the registry if the input data was determined to be valid.

* * * * *